United States Patent [19]

Forester et al.

[11] Patent Number: 4,601,815

[45] Date of Patent: Jul. 22, 1986

[54] PASSIVATION OF FCC CATALYSTS

[75] Inventors: David R. Forester, The Woodlands; Raymon C. Barlow, Conroe, both of Tex.

[73] Assignee: Betz Laboratories, Inc., Trevose, Pa.

[21] Appl. No.: 686,859

[22] Filed: Dec. 27, 1984

[51] Int. Cl.$^4$ ............................................. C10G 11/05
[52] U.S. Cl. .............................. 208/120; 208/52 CT; 502/521
[58] Field of Search ........................... 208/120, 52 CT; 502/521

[56] References Cited

U.S. PATENT DOCUMENTS

| | | | |
|---|---|---|---|
| 4,101,417 | 7/1978 | Mitchell et al. | 208/120 |
| 4,255,287 | 3/1981 | Bertus et al. | 502/521 |
| 4,324,648 | 4/1982 | Roberts et al. | 208/120 |
| 4,326,990 | 4/1982 | Mark et al. | 502/521 |
| 4,466,884 | 8/1984 | Occelli et al. | 208/52 CT |
| 4,489,169 | 12/1984 | Bertus et al. | 502/521 |

*Primary Examiner*—William R. Dixon, Jr.
*Assistant Examiner*—Cynthia A. Prezlock
*Attorney, Agent, or Firm*—Alexander D. Ricci; Bruce E. Peacock; James D. Dee

[57] ABSTRACT

This invention is directed to a method of using tin to passivate cracking catalysts contaminated with vanadium. The improvement resides in the use of tin alone without the need for synergists such as antimony, phosphorus, and/or sulfur compounds.

10 Claims, No Drawings

PASSIVATION OF FCC CATALYSTS

BACKGROUND OF THE INVENTION

This invention relates to the art of catalytic cracking of hydrocarbons, and in particular to methods of inhibiting the deterioration of the zeolite catalysts due to contamination by metals, particularly vanadium, which are contained in the hydrocarbon feedstock. The problems associated with metal contamination of the catalyst during the catalytic cracking of hydrocarbons to yield light distillates such as gasoline as well as the actual conditions and procedures utilized are comprehensively documented in U.S. Pat. Nos. 4,101,417, 4,324,648, and 4,432,890, each of which is incorporated herein by reference. The invention herein represents an innovation and improvement over those processes set forth and claimed in U.S. Pat. Nos. 4,101,417 and 4,324,648.

More specifically, as described in U.S. Pat. No. 4,432,890 the carbon (coke) which deposits upon the zeolitic catalyst during the cracking process is eliminated by subjecting the catalyst upon removal from the catalytic cracking reactor to a regeneration stage. In this stage, the coked catalyst is heated with oxygen containing gas to a temperature of 1200° F. where the coke is in essence converted and eliminated. Along with the deposition of coke on the catalyst is the deposition of metal contaminants (from feedstock) such as nickel, vanadium, iron and the like. Obviously, as the contamination level increases (both metal and coke), the effectiveness of the catalyst deteriorates.

While the regeneration process is quite effective in eliminating coke from the catalyst, the elevated temperature of regeneration is such as to cause a problem between the zeolite catalyst and any vanadium deposited therein. More specifically the vanadium is converted to vanadium oxides (pentoxide primarily) which possesses a melting point in the regeneration temperature range. Consequently the melting vanadium flows across the catalyst causing pore plugging, particulate coalescence, neutralization of the acidic groupings of the zeolite and generally causing irreversible damage to the crystalline structure of the zeolite.

The present invention is directed to a method of mitigating the destructive nature of the deposited vanadium on the zeolite catalysts.

GENERAL DESCRIPTION OF THE INVENTION

It was discovered that when a zeolite catalyst contaminated with coke and metals, including vanadium, is treated with tin or sources thereof alone prior to regeneration thereof, the destructive nature of the vanadium pentoxides normally formed were mitigated to a great extent.

Therefore the conversion-effectiveness of the catalyst upon subsequent reuse remained substantially unaffected. The substance of the innovation lies in the time of treatment of the vanadium containing catalyst as well as the criticality between vanadium and tin levels. It should be noted, however, that the use of tin for the passivation of metal contaminants on cracking catalysts has been suggested. However, prior to this invention, tin was not deemed to be effective when used alone and at low levels of treatment. For example, all of the patents assigned to Phillips Petroleum Company directed to zeolite cracking catalyst passivation using tin indicate that it cannot be used alone but must be used in combination with one or more passivators such as antimony, sulfur, or phosphorus (U.S. Pat. Nos. 4,255,287, 4,257,919, 4,321,129, and 4,326,990).

U.S. Pat. No. 2,901,419 claims the use of various metals and compounds (mainly zinc and zinc fluoride) as passivators for deactivating metals on acid-activated bentonite cracking catalysts. Metallic tin is disclosed, but no examples were given in support. Virtually all fluid catalytic cracking (FCC) processes now use zeolite containing cracking catalysts, which show much greater activity than the bentonite catalysts and thus are significantly different as explained in great detail in U.S. Pat. No. 4,432,890. Therefore, passivation technology of zeolite containing cracking catalysts is not the same as that claimed in U.S. Pat. No. 2,901,419 for non-zeolites.

U.S. Pat. No. 4,101,417 claims the use of tin at 2000 ppm and higher to passivate primarily nickel contaminants on zeolite containing cracking catalysts. This patent covers catalysts containing at least 1500 ppm nickel equivalents [nickel ppm+(0.2) (vanadium, ppm)]and its only examples use a zeolite catalyst containing 2500 ppm nickel and 350 ppm vanadium (2570 nickel equivalents). Literature indicates that levels of vanadium below about 1000 ppm show little if any effect on zeolite cracking catalyst activity. (See the newsletter *Catalagram* published by Davison Chemical in 1982, Issue Number 64.) Also, refiners usually find it unnecessary to passivate their FCC zeolite catalysts until approximately 1000 ppm vanadium is present on the catalyst due to its limited deactivating effect below 1000 ppm. The only examples of passivation with tin in U.S. Pat. No. 4,101,417 were at 6100 ppm tin. This gives an extremely low vanadium to tin ratio of 1:17.4.

U.S. Pat. No. 4,324,648 discloses that tin alone decreased catalyst activity (i.e., showed no positive passivation benefit on zeolite cracking catalyst activity, Col. 2, line 34 et seq. and Col. 15, lines 55-67), a detriment which could be offset by using antimony and tin in combination. Data in Table VIII of the patent indicates that use of 100-5000 ppm tin to passivate a catalyst containing 6000 ppm vanadium and 3800 ppm nickel caused a decrease in catalyst activity of approximately 2 vol. %. Use of 10,000 ppm tin on this same catalyst caused a decrease of approximately 4 vol. %. The vanadium to tin ratios used in this data ranged from 60:1 to 1:1.67, significantly higher than those in U.S. Pat. No. 4,101,417 and encompassing those of the present invention at a vanadium level more indicative of commercial experience than U.S. Pat. No. 4,101,417.

A possible explanation as to why U.S. Pat. No. 4,324,648 showed no positive benefit from tin alone and therefore required phosphate and/or sulfur catalytic agents is that the catalysts used in these examples were equilibrium catalysts, meaning the catalyst contaminant metals had accumulated to a constant rate in a commercial FCC unit. U.S. Pat. No. 4,432,890 states (Col. 5, line 66 to Col. 6, line 17) that as the vanadium (oxide) builds up on the catalyst it melts at regeneration temperatures and flows into the zeolite structure leading to neutralization of acid sites and irreversible destruction of the crystalline aluminosilicate structure. In accordance with the present invention, it was discovered that the passivation metals (tin) must complex with the vanadia *before* the vanadia reacts with the acid site, to make higher melting point compounds before regeneration temperatures are reached, thus avoiding zeolite destruction and permanent activity loss. If the examples or art of the present invention are followed, passivation of vanadium by tin is accomplished at low levels and without the need for additional passivators and/or additional catalytic agents. These aspects will be described fully in the following more specific description of the invention.

DETAILED DESCRIPTION OF THE INVENTION

As earlier indicated, the invention is directed to a process of passivating vanadium contained on a zeolitic cracking catalyst.

The total process generally entails:

(a) contacting a hydrocarbon feedstock with a fluidized zeolite-containing cracking catalyst in a cracking zone under cracking conditions;

(b) recovering the cracked product;

(c) passing the cracking catalyst from the cracking zone to a regeneration zone;

(d) regenerating the cracking catalyst in the regeneration zone by contact with oxygen-containing gas under regeneration conditions to produce a regenerated catalyst; and (e) introducing the regenerated catalyst to the cracking zone for contact with the hydrocarbon feedstock;

wherein the catalyst during the cracking process is contaminated with from about 500 to 10,000 parts per million parts of catalyst with vanadium contained in the feedstock, which vanadium would at regeneration temperature and condition affect the catalyst in a manner which would detrimentally affect its efficiency upon being reintroduced to said cracking zone for reuse;

the improvement comprising treating the vanadium contaminated cracking catalyst prior to its reaching equilibrium and prior to the subjection thereof to regeneration temperatures with a phosphorus and sulfur free material consisting essentially of tin or a source thereof, the amount of tin utilized being from 1 to 1999 ppm on the cracking catalyst and at ratios with vanadium of from 1:1 to 20:1 vanadium to tin, preferably 3:1 to 10:1.

Equilibrium as used in the present claims means that the approximate level of contaminant metals is relatively constant for a given fresh catalyst makeup rate and fresh contaminant metals deposited from the hydrocarbon feedstock.

Examples of tin sources and materials containing tin which can be employed are those which are phosphorus and sulfur free materials including elemental tin, stannous halides, mixed halides and hydrides, nitrates, oxides, and the like from inorganic sources.

Organic sources include tin carbonates, stannous formate, acetates, butyrates, octoate and the like. (See U.S. Pat. No. 4,324,648, Col. 2, line 54 et seq. and Col. 4, line 28 et seq.) Generally the cracking catalyst is contacted with the tin or tin source in such a manner as to add to the catalyst a tin concentration of 0.0001 to 0.1999 percent by weight (preferably 0.005–0.15 percent) of the cracking catalyst with the ultimate desire to achieve a ratio of contaminant vanadium to tin in the vicinity of 3:1 to about 6:1 using 3000 ppm vanadium, a commonly encountered amount in commercial FCC processes using zeolite cracking catalyst. In any event the amount of tin utilized is substantially below 2000 ppm (U.S. Pat. No. 4,101,417) and more in the vicinity of 200 to 1000 ppm tin with the amount of vanadium on the catalyst usually being in the 1000–5000 ppm range.

The most desirable manner of contacting or treating cracking catalyst with the tin or material containing the tin will depend upon the particular operation. However, either (1) compounding (mixing) the dry catalyst with the dry tin compound, (2) treating the catalyst with a solvent or solution containing the tin or tin compound and permitting it to dry or (3) adding to the catalyst tin which has been dissolved or dispersed in the hydrocarbon feedstock and thereby permitting contact while unit is in use.

More detailed information relative to the invention will be evident from the following specific embodiments.

SPECIFIC EMBODIMENTS

In the Examples shown in Table 1, a commercial zeolite crystalline alumino silicate cracking catalyst was used. The catalytic cracking runs were conducted employing a fixed catalyst bed, a temperature of 900° F., a contact time of 75 seconds, and a catalyst to oil ratio of 3:1. The feedstock used for these cracking runs was a gas oil feedstock having a boiling range of approximately 500 to 1000° F.

The fresh zeolite catalyst was treated for 1 hour with air at 1200° F. and designated catalyst A. It provided a conversion of 84.2 vol. % and 65.5% was $C_4$ to $C_{12}$ products, the most desired.

To catalyst A, 3000 ppm each of nickel and vanadium were added as metal contaminants and the catalyst dried to remove solvent, then treated with oxygen for one hour at 1200° F. The metal contaminated catalyst (B) showed a 15% reduction in conversion to 69.2% and 13.2% reduction in desirable products to 52.3%. To catalyst B, either 500 or 1000 ppm of tin in the form of a tin oxide dispersion was added, the catalysts dried and were treated with oxygen at 1200° F. for 1 hour. The catalyst treated with 500 ppm tin (C) showed a partial restoration of activity lost due to the nickel/vanadium, exhibiting increases in conversion from 69.2 to 75.0 vol. % and desirable products from 52.3 to 56.8 vol. %. Catalyst D (treated with 1000 ppm tin) showed a slightly greater restoration of catalyst activity, increasing the conversion from 69.2 to 79.1 vol. % and desirable products from 52.3 to 61.4 vol. %.

Catalyst B was also treated with 500 ppm or 1000 ppm tin derived from a stannous octoate solution and treated as previously. These catalysts (E and F) also showed significant restoration of catalyst activity.

The procedure utilized to test the efficacy of zeolite catalysts treated in accordance with the present invention is that which is outlined in the ASTM-D-3907, which is incorporated herein by reference.

TABLE 1

| Catalyst | Metals, ppm | Sn, ppm | Conversion, Vol. % | $C_{4-12}$, Vol. % |
|---|---|---|---|---|
| A | None | 0 | 84.2 | 65.5 |
| B | Nickel, 3000 Vanadium, 3000 | 0 | 69.2 | 52.3 |
| C | Nickel, 3000 Vanadium, 3000 | 500 | 75.0 | 56.8 |
| D | Nickel, 3000 Vanadium, 3000 | 1000 | 79.1 | 61.4 |
| E | Nickel, 3000 Vanadium, 3000 | 500 | 80.6 | 63.6 |
| F | Nickel, 3000 Vanadium, 3000 | 1000 | 77.7 | 56.2 |
| G | Nickel, 3000 | 0 | 74.9 | 39.7 |
| H | Nickel, 3000 | 500 | 74.6 | 43.7 |
| I | Vanadium, 3000 | 0 | 79.3 | 53.7 |

TABLE 1-continued

| Catalyst | Metals, ppm | Sn, ppm | Conversion, Vol. % | $C_{4-12}$, Vol. % |
|---|---|---|---|---|
| J | Vanadium, 3000 | 500 | 84.1 | 58.5 |

To Catalyst A, 3000 ppm of nickel was added as a metal contaminant and the catalyst dried to remove solvent, then treated with oxygen for one hour at 1200° F. This catalyst (G) showed a 9.3% reduction in conversion and 25.8% reduction in desirable products. Then 500 ppm tin in the form of tin octoate solution was added to Catalyst G and the catalyst was dried and treated with oxygen at 1200° F. for 1 hour. This Catalyst H showed no improvement in conversion and slight improvement indesirable products. The experiment was repeated using 3000 ppm vanadium with and without 500 ppm tin from stannous octoate. Catalyst I showed a drop in conversion of 4.9% and a reduction in desirable products of 11.8%. Catalyst J containing 500 ppm tin restored conversion to nearly that of fresh catalyst and increased desirable products 4.8%.

It is apparent from the foregoing that catalysts treated in accordance with the procedures and treatment levels as prescribed by the present innovation permitted restoration of its conversion capacity by preventing the normal loss of conversion due to vanadium.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What we claim is:

1. In a process comprising:
   (a) contacting a hydrocarbon feedstock with a fluidized zeolite-containing cracking catalyst in a cracking zone under cracking conditions;
   (b) recovering the cracked product;
   (c) passing the cracking catalyst from the cracking zone to a regeneration zone;
   (d) regenerating the cracking catalyst in the regeneration zone by contact with oxygen-containing gas under regeneration conditions to produce a regenerated catalyst; and
   (e) introducing the regenerated catalyst to the cracking zone for contact with the hydrocarbon feedstock;
   wherein the catalyst during the cracking process is eventually contaminated with from about 500 to 10,000 parts per million parts of catalyst with vanadium contained in the feedstock, which vanadium would at regeneration temperatures and conditions affect the catalyst in a manner which would detrimentally affect its efficiency upon being reintroduced to said cracking zone for reuse;
   the improvement comprising treating the vanadium contaminated cracking catalyst prior to its reaching equilibrium and prior to the subjection thereof to regeneration temperatures with a material consisting essentially of tin or a source thereof, the amount of tin utilized being from 1 to 1999 ppm of catalyst.

2. A method in accordance with claim 1 wherein the catalyst contains from 500 to 10000 ppm of vanadium contained thereon.

3. A method in accordance with claim 2 wherein the catalyst is treated with said tin in an amount to assure a ratio of vanadium to tin of 1:1 to about 10:1, and preferably 3:1 to 6:1.

4. A method according to claim 3 wherein the catalyst is treated with the tin by mixing each together as dry particulate components.

5. A method according to claim 3 wherein the catalyst is treated with a dispersion or solution of the tin and the liquid medium is permitted to dry.

6. A method according to claim 3 wherein the catalyst is treated with the tin by adding the tin to the feedstock.

7. A method according to claim 4, 5 or 6, wherein the source of tin is inorganic and does not contain sulfur or phosphorus.

8. A method according to claim 4, 5, or 6 wherein the source of tin is organic and does not contain sulfur or phosphorus.

9. A method according to claim 8 wherein the tin source is stannous octoate.

10. A method according to claim 7 wherein the tin source is tin oxide.

* * * * *